June 22, 1954 R. ADLER 2,681,995
ELECTRON DISCHARGE DEVICE AND CIRCUITS
Filed Nov. 26, 1949
2 Sheets-Sheet 1
Fig. 2
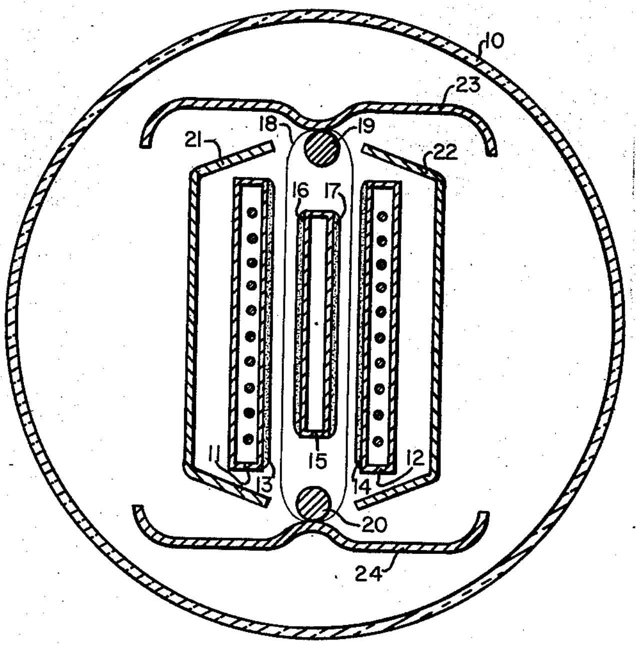
Fig. 1
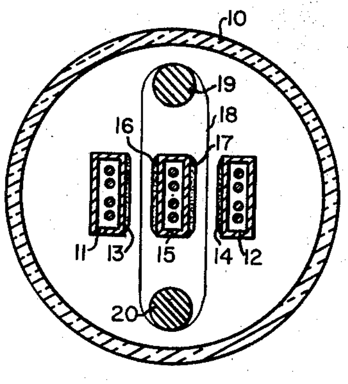
Fig. 4
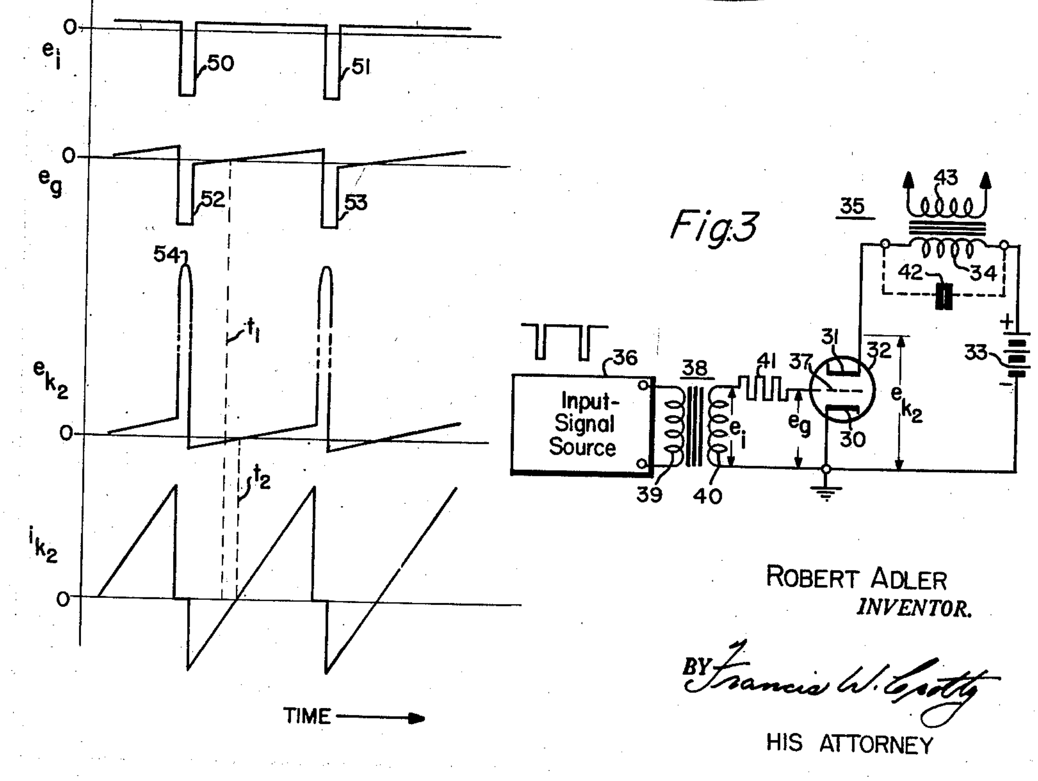
Fig. 3
ROBERT ADLER
*INVENTOR.*
BY Francis W. Crotty
HIS ATTORNEY ROBERT ADLER
*INVENTOR.*
BY Francis W. Crotty
HIS ATTORNEY Patented June 22, 1954

2,681,995

UNITED STATES PATENT OFFICE 2,681,995

ELECTRON DISCHARGE DEVICE AND CIRCUITS

Robert Adler, Chicago, Ill., assignor to Zenith Radio Corporation, a corporation of Illinois Application November 26, 1949, Serial No. 129,554

25 Claims. (Cl. 250—36)

This invention relates to electron-discharge devices and to circuits employing such devices. It is a primary object of the present invention to provide a novel type of electron-discharge device as a new tool in the art, and to provide novel circuits embodying the novel device.

Most electron-discharge devices of the type utilized in electronic applications, such as carrier-wave translating systems and the like, are subject to the limitation of being unilaterally conductive. Consequently, the versatility of conventional devices of this type is limited to circuit applications in which current need be passed only in a single direction.

It is therefore a primary object of the present invention to provide a bidirectional electron-discharge device.

Another object of the invention is to provide a high-vacuum electron-discharge device having an electron-discharge path which is capable of passing current in either direction.

Yet another object of the invention is to provide a bidirectional electron-discharge device in which the space current flow is subject to external control.

Still another object of the invention is to provide an improved electron-discharge device capable of passing current of either positive or negative polarity through an associated load circuit.

The unilateral character of prior art electron-discharge devices is encountered as a limitation in many circuit applications and results in many cases in the use of complex circuits involving a large number of components to perform a desired function. One such application which makes this limitation readily apparent is the generation of an output current of sawtooth waveform, as for example in the production of a sawtooth deflection current for use in the scanning system of a television receiver. Prior art arrangements for accomplishing this purpose incorporate unilateral electron-discharge devices and, consequently, utilize a relatively large number of circuit components. In addition, sufficient sawtooth current for operating the line-frequency scanning system of a television receiver is only obtained by using relatively high supply voltages.

Consequently, it is an important object of the present invention to provide novel signal-generating apparatus embodying a bidirectional electron-discharge device.

It is a further object of the invention to provide improved apparatus for generating an output current of sawtooth waveform.

Yet another object of the invention is to provide improved and simplified apparatus for generating a sawtooth output current of sufficient magnitude, for example, to drive the scanning system of a television receiver while reducing the supply voltage requirements.

In accordance with one feature of the present invention, a new and improved bidirectional high vacuum electron-discharge device having a bidirectional electron-discharge path comprises a pair of thermionic cathodes and a control electrode disposed between the cathodes for controlling electron space current flow therebetween. Furthermore, one of the cathodes is preferably arranged to be heated by radiation from the other cathode.

In accordance with still another feature of the invention, signal-generating apparatus for generating an output current of sawtooth waveform comprises a bidirectional electron-discharge device having a pair of thermionic cathodes and a control grid intermediate the cathodes for controlling electron space current flow therebetween. An input circuit is coupled between the control grid and one of the cathodes, and an input-signal source is coupled to the input circuit for applying to the control grid control pulses of predetermined time duration short relative to their periodicity. An output load circuit, resonating at a frequency having a period at least equal to substantially twice the predetermined time duration of the individual control pulses, is coupled between the cathodes, and means are provided for impressing a unidirectional operating potential difference between the cathodes and in series with the output load circuit.

Throughout the specification and the appended claims, the term "cathode" is used as definitive of an electrode which is capable of thermionic emission and is not intended to be restricted to an electrode which is connected to the negative terminal of the external circuit. Furthermore, the term "bidirectional," as applied to an electron-discharge device or to an electron-discharge path, is to be interpreted to mean that the device or the path is capable of passing current in either direction, as contrasted with prior art devices which are unilaterally conductive only. A "bidirectional" electron-discharge path is thus construed as one which is defined by terminating electrodes each of which is capable of supplying space electrons, so that space current flow may be established in either direction by providing appropriate operating potentials.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1 is a cross-sectional view of an electron-discharge device constructed in accordance with the present invention;

Figure 2 is a cross-sectional view of another embodiment of the invention;

Figure 3 is a schematic circuit diagram of a signal generator embodying the invention;

Figure 4 is an idealized graphical representation useful in understanding the operation of the circuit of Figure 3, and Figures 5, 6 and 7 are schematic diagrams of further embodiments of the invention.

Figures 5, 6, 7:
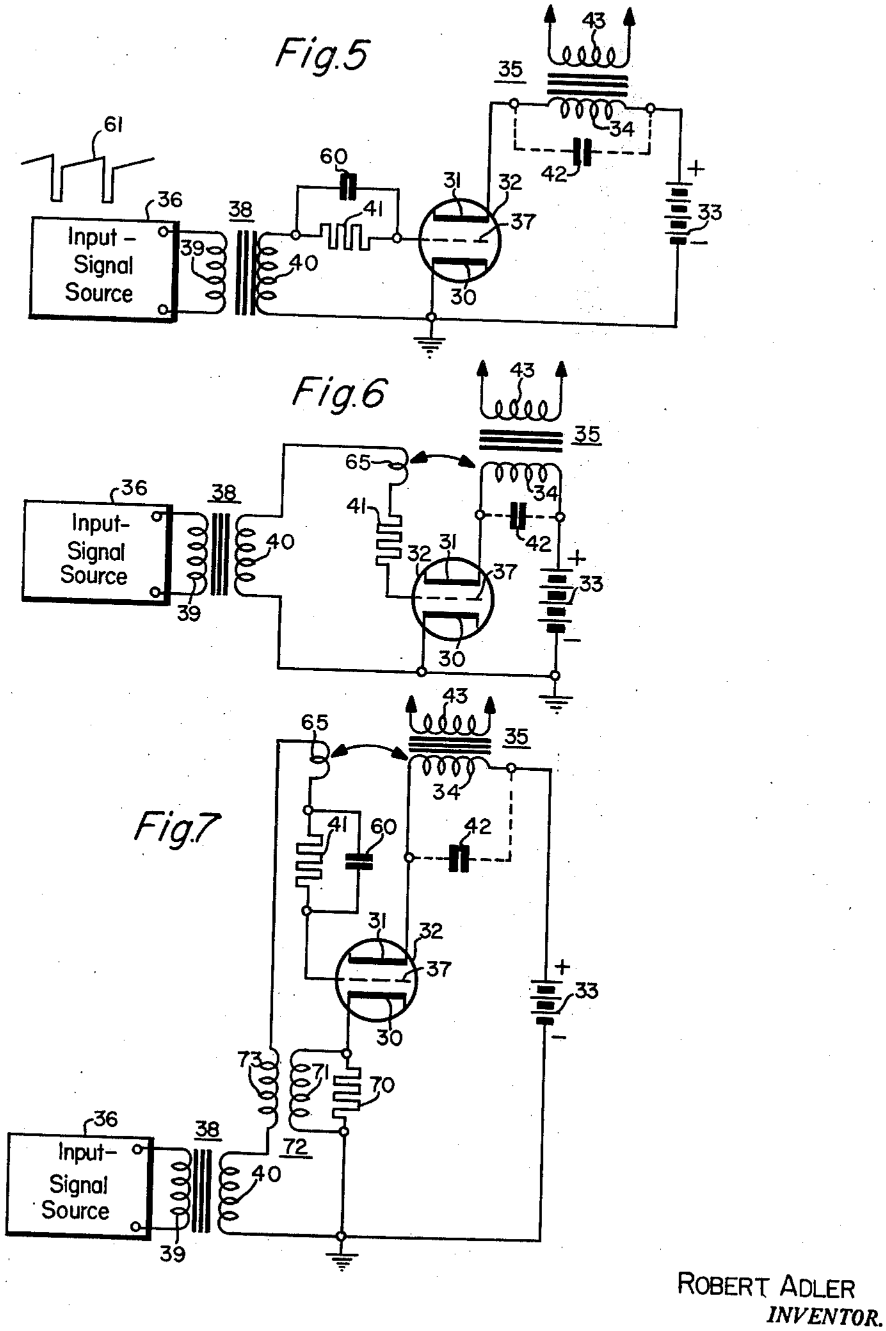

In Figure 1, an electron-discharge device constructed in accordance with the invention comprises, within an evacuated envelope 10, a pair of thermionic cathodes and a control grid intermediate the cathodes. Preferably, the first cathode comprises a pair of members 11 and 12 having thermionically emissive surfaces 13 and 14 respectively. The second cathode 15 is disposed between members 11 and 12 and is provided with a pair of thermionically emissive surfaces 16 and 17 opposite surfaces 13 and 14 respectively. Suitable means are provided for heating members 11 and 12 of the first cathode and second cathode 15; for example, individual heater elements may be provided for each cathode member. A control grid 18, which may be of the parallel-wire type, is arranged to surround second cathode 15, and the conductive grid elements are disposed between second cathode 15 and members 11 and 12. Control grid 18 may be conveniently supported by means of side-rods 19 and 20. Members 11 and 12 are connected together for operation at a common potential by circuit means (not shown) which may be either internal or external of evacuated envelope 10.

A device constructed as shown in Figure 1 is highly unconventional in that it is capable of passing electron space current in either direction between the first cathode, comprising members 11 and 12, and the second cathode 15, depending on the relative operating potentials applied to the two cathodes. Thus, at a particular instant of time, second cathode 15 may be maintained at a potential higher than that of first cathode members 11 and 12. In this event, second cathode 15 instantaneously operates as an anode or collector for electrons originating at emissive surfaces 13 and 14. Electrons emanating from emissive surfaces 16 and 17 encounter a retarding field, due to the lower operating potential of first cathode members 11 and 12, and are prevented from reaching the first cathode.

Conversely, if at another instant of time first cathode members 11 and 12 are operated at a potential higher than that of second cathode 15, the first cathode members operate instantaneously as an anode or collector for electrons originating at emissive surfaces 16 and 17, and electrons emanating from surfaces 13 and 14 are suppressed.

Control grid 18 serves as a convenient means for controlling the electron space current flow between the cathodes constituting the terminating electrodes for the electron-discharge path. At any instant of time, the control grid has an effective amplification factor or mu relative to the terminating electrode acting as anode at that instant, since the device operates instantaneously as a conventional triode. However, the device differs from conventional electron-discharge amplifiers in the bidirectional nature of the discharge path.

It is important to note that the control grid 18 is preferably operated at a positive potential with respect to the cathode instantaneously operating as the electron space current source for the unconventional purpose of controlling the emission-current density of that cathode. While such operation results in a large amount of grid current, the voltages involved are small so that the power dissipated in the grid circuit is not excessive.

For convenience, it is possible to operate the device of Figure 1 with first cathode members 11 and 12 maintained at a fixed reference potential such as ground. The direction of electron space current flow is then dependent upon whether the instantaneous potential of second cathode 15 is above or below the fixed reference potential applied to members 11 and 12. For conduction in either direction, it is apparent that there must be a potential difference between the two cathodes. Furthermore, large voltage pulses may be produced if the control grid is driven sharply beyond cut-off and if an inductive load impedance is connected in the output circuit. Consequently, it is necessary with the device of Figure 1 to take the precaution of properly insulating the respective heater elements associated with the respective cathodes. Such insulation may conveniently be accomplished in the filament transformer; however, such special insulation of the filament transformer windings is costly.

An electron-discharge device constructed in accordance with the invention which obviates the necessity for special insulation between the windings of the filament transformer is illustrated in transverse section in Figure 2. As before, the device comprises first cathode members 11 and 12 having emissive surfaces 13 and 14 respectively. The second cathode 15 is disposed between members 11 and 12 and provided with emissive surfaces 16 and 17 facing members 11 and 12 respectively. Again, a control grid 18 supported by side-posts 19 and 20 is arranged to surround second cathode 15 with its conductive grid elements intermediate second cathode 15 and first cathode members 11 and 12. Members 11 and 12 are indirectly heated, as in the embodiment of Figure 1, by conventional heater elements disposed within the cathode sleeves. However, second cathode 15 is heated in another manner. For this purpose, heat-shield members 21 and 22 are arranged in heat-reflecting relation with first cathode members 11 and 12 respectively, so that heat developed in the first cathode members is directed inwardly to second cathode 15 to raise the temperature of that cathode to a sufficient extent to establish thermionic emission. Since the envelope 10 is evacuated, the only substantial heat loss is by radiation so that heating by radiation, direct as well as reflected, is relatively efficient, and second cathode 15 may be raised to its emission temperature within a relatively short period of time.

As explained in connection with Figure 1, second cathode 15 operates instantaneously as a collector or anode for electrons originating at surfaces 13 and 14 when the potential of second cathode 15 is higher than that of first cathode members 11 and 12. When the second cathode 15 is operating as an electron collector, additional heat is developed at the electrode by its plate dissipation in the role of anode. It has been found that sufficient heat may be generated in second cathode 15 by the arrangement shown in Figure 2 to establish electron emission from surfaces 16 and 17 and thereafter to maintain second cathode 15 at or above emission temperature, particularly when the device is used in circuits of the type hereinafter to be described, in which the second cathode 15 serves as anode, and therefore develops heat by plate dissipation, during a substantial portion of each operating cycle. Therefore, the requirement for a separate heater element associated with second cathode 15 is obviated, and by operating first cathode members 11 and 12 at ground potential, costly special insulation in the filament transformer need not be provided.

In order to prevent overheating of the control grid 18, radiating fins 23 and 24 may be welded or otherwise secured to supporting posts 19 and 20 respectively. Preferably, the inner surfaces of fins 23 and 24 are polished and the outer surfaces are blackened for optimum heat dissipation.

The devices of Figures 1 and 2 may be constructed of conventional parts. For example, commercially available cathode members, having oxide coatings, may be employed, and the grid 18 may conveniently be made by using side-posts 19 and 20 of a diameter equal to the desired spacing between opposite sides of the grid. All of the electrodes may be supported between a pair of mica spacers (not shown) within envelope 10, and the device may be evacuated, gettered, and based in a manner well known in the art. Cathode members 11 and 12 may be connected together internally or, alternatively, separate external connections may be provided for these members.

While each of the devices of Figures 1 and 2 comprises a pair of physically separate electron paths arranged in parallel, it is within the scope of the invention to construct a device comprising only two cathode members defining a single electron path. The parallel-path arrangement is particularly advantageous in that it effectively doubles the current capacity of the device, and lends itself well to manufacture in large quantities by well-known production techniques.

A bidirectional electron-discharge device of the type shown in Figures 1 and 2 is a versatile new tool in the art and may be adapted to many purposes; by way of example, it is particularly useful in signal-generating apparatus for producing an output current of sawtooth waveform.

Signal-generating apparatus of this type is illustrated schematically in Figure 3, in which the cathodes 30 and 31 of a bidirectional electron-discharge device 32 are connected in series with a source of unidirectional operating potential, here shown as a battery 33, and the primary winding 34 of an output transformer 35. An input-signal source 36, which may be a source of negative-polarity pulses of predetermined time duration which is short relative to their periodicity, is coupled between the control grid 37 of device 32 and first cathode 30 by means of an input transformer 38 having primary and secondary windings 39 and 40 respectively; a current-limiting resistor 41 is included in series with secondary winding 40 and control grid 37. First cathode 30 is directly connected to ground.

In the circuit of Figure 3, device 32 is maintained in a conductive state except for a short interval during each cycle. During the first portion of the conductive period, inductor 34 delivers power to battery 33; during the second half of the conductive cycle, power is delivered from battery 33 to load inductor 34. If there were no losses in the circuit, the net direct-current component would be zero, due to the bidirectional character of the current in the series circuit comprising device 32, inductor 34, and battery 33.

At the end of the desired conductive period, a negative pulse is supplied to control grid 37 to cut off device 32, thus interrupting current flow in the series output current path. Consequently, inductor 34, together with its parallel capacity 42, goes through substantially one-half cycle of free oscillation. Capacity 42 may conveniently consist of capacity reflected from secondary winding 43 of output transformer 35 and from circuits connected thereto (not shown), and is of sufficient magnitude to resonate with inductor 34 at a frequency having a half-period substantially equal to the predetermined time duration of the individual control pulses. Consequently, when the control pulse is removed from control grid 37 and device 32 again becomes conductive, the current through coil 34 has shifted in phase by substantially 180°, and the output current cycle is repeated.

Since the time rate of change of current from a constant unidirectional voltage source through a constant inductor is constant and dependent only on the ratio of the voltage of the source to the inductance of the load, the output current during the conductive period is of constant slope, and this slope may be adjusted to any desired value by suitable selection of operating potential and load inductance. The flyback time from the end of one conductive period to the beginning of the next may be very short and is determined by the natural half-period of output inductor 34 and capacity 42. Since capacity 42 is very small, particularly when it constitutes only the capacity reflected from secondary winding 43 and the circuits connected thereto, the flyback time may be quite rapid. Hence it is apparent that the circuit of Figure 3 may be used to advantage to supply the deflection yokes of a television receiver with deflection current of sawtooth waveform for scanning purposes.

For a better understanding of the operation of the circuit of Figure 3, reference is now made to the waveforms of Figure 4, in which curves of input voltage, control grid voltage (or control signal), second-cathode voltage, and second-cathode current are plotted as functions of time. The input voltage $e_i$, appearing across secondary winding 40 of input transformer 38 from input-signal source 36, may conveniently consist of a series of periodic negative-polarity control pulses individually having a predetermined time duration. Since the input voltage is impressed across a coil 40, the average input voltage over each cycle must be zero. Consequently, the input voltage $e_i$ is slightly positive during the intervals between successive control-signal pulses 50 and 51. During these intervals, therefore, grid current tends to be drawn. However, series resistor 41 included in the input circuit serves to limit this grid current so that the control signal $e_g$ applied between control grid 37 and first cathode 30 comprises negative pulses 52 and 53 between which the grid voltage gradually rises from a value which is initially slightly negative at the beginning of the conductive period to one which is positive at the end of the conductive period. The voltage $e_{k_2}$ of the second cathode 31 with respect to ground is somewhat more negative than that of the control grid 37 at the beginning of the conductive period and somewhat more positive at the end of the conductive period.

When the control pulses 52 and 53 are applied to grid 37, electron space current flow in device 32 is cut off and the series output circuit is opened. The voltage $e_{k_2}$ then oscillates at a frequency determined by inductor 34 and capacity 42 until the control pulse is removed from control grid 37. By making capacity 42 of such magnitude that it resonates with inductor 34 at a frequency having a half-period substantially equal to the predetermined time duration of each of the control pulses, the voltage $e_{k_2}$ is caused to oscillate through substantially one-half cycle during the cut-off period, so that the voltage $e_{k_2}$ swings up to a positive peak 54 and then rapidly downward to a negative value at the beginning of the next conductive period, thus insuring proper phasing of the output current. The output current $i_{k_2}$, which also represents the current through device 32, is of substantially a sawtooth waveform, and reverses in direction or polarity near the middle of the conductive period. The output current $i_{k_2}$ is, of course, zero during the intervals of control pulses 52 and 53, since device 32 is non-conductive during these intervals.

Ideally, the current should reverse direction exactly at the middle of the conductive period, so that the peak positive and negative currents are equal; in such a case, no direct-current component would appear in the output. In practice, however, the load is not purely inductive and some voltage drop is required between the cathodes to obtain the required flow of current. There is, therefore, an energy loss during each cycle, and the negative current after flyback is of smaller magnitude than the positive current at the end of the conductive period. Consequently there is a small net direct-current component in the output.

In order to avoid undesirable space charge effects which might result in further energy loss and in non-linearity in the output current waveform, it is desirable to select the values of the several circuit components so that the voltage $e_g$ of control grid 37 with respect to ground changes sign somewhat before the voltage $e_{k_2}$ of the second cathode 31 with respect to ground swings from negative to positive. This operation has been illustrated in the graphical representation of Figure 4, in which the grid voltage $e_g$ swings through zero at a time $t_1$ slightly before the time $t_2$ when the voltage $e_{k_2}$ changes sign.

It is noted that the waveforms of Figure 4 are drawn to different scales, the pulses appearing at the second cathode during flyback being many times larger in peak value than the negative control pulses applied to grid 37.

In practice, the system of Figure 3 is not only very simple, but is also much more efficient than conventional sawtooth current generators. The voltage drop across device 32 may be as low as ten volts, so that a supply voltage of about 100 volts sufficies to obtain efficient operation. The current density within the tube is dependent upon the potential difference between the grid and the instantaneous space-electron source; if the spacing between the grid and each of the cathodes is about .010 inch, ten volts of positive grid potential suffice to provide a current density of about 120 milliamperes per square centimeter, which is about the maximum recommended for oxide-coated cathodes from a cathode-life standpoint.

To operate the line-frequency scanning system of a television receiver using a 12-inch picture tube with a supply voltage of about 100 volts requires a peak-to-peak sawtooth output current of the order of 500 milliamperes, or plus-and-minus 250 milliamperes neglecting the direct-current component. Consequently, sufficient space current may be supplied for this application by cathodes having emitting areas of a few square centimeters. Of course, larger output currents may be obtained by using larger cathode emitting areas.

With the arrangement of Figure 3, substantial amounts of grid current are drawn. The circuit of Figure 5 is a modification in which the amount of grid current is reduced and, therefore, the efficiency of the circuit is increased. The circuit is identical with that of Figure 3 with the exception that a self-biasing condenser 60 is connected in the input circuit in parallel with current-limiting resistor 41. Thus, the control grid 37 is self-biased. With this arrangement, a sawtooth driving voltage is superimposed on the pulse-signal to provide an input-signal having a waveform similar to that of the control grid voltage $e_g$ of Figure 4. It is possible so to adjust the value of resistor 41 that less grid current is drawn and higher efficiency is obtained than with the circuit of Figure 3.

When the slope of the sawtooth component of the input-signal is less than the desired value, it may be advantageous to insert an unbypassed series resistor (not shown) in series in the input circuit between coil 40 and control grid 37.

In accordance with another feature of the invention, it is possible to derive the control pulses for cutting off device 32 from the output circuit. Such an arrangement is illustrated in Figure 6, in which a feedback coil 65, inductively coupled to output inductor 34, is series-coupled in the input circuit. Preferably, the voltage ratio of the feedback coil 65 with respect to the output inductor 34 is made substantially equal to the reciprocal of the effective amplification factor of control grid 37 with respect to second cathode 31, so that the voltage pulse fed back to the input circuit is of sufficient magnitude to render device 32 con-conductive. With such an arrangement, the input-signal from source 36 comprises only pulses of relatively small amplitude to insure that cut-off be initiated at the proper time. Alternatively, the input-signal may comprise a single sawtooth wave of sufficient amplitude to initiate cut-off at the beginning of the flyback period. To obtain greater grid current efficiency, a self-biasing condenser may be connected in parallel with resistor 41 and the input-signal from source 36 may be of the same type as signal 61 applied to the circuit of Figure 5, comprising a sawtooth wave superposed on periodic negative-polarity pulses; however, the input pulses need be only of relatively small magnitude.

When the control pulses are derived from the output circuit, as by means of feedback coil 65, the input pulses from source 36 need be only of relatively small magnitude. When the voltage ratio of feedback coil 65 with respect to inductor 34 is made equal to the reciprocal of the effective amplification factor of device 32 measured from grid 37 to second cathode 31, the input pulses should be of a time duration substantially equal to the natural half-period of inductor 34 and capacity 42. Input pulses of shorter time duration may be used if the voltage ratio of feedback coil 65 with respect to inductor 34 exceeds the reciprocal of the effective amplification factor, so that, in a generic sense, it is necessary that capacity 42 be of magnitude to resonate with inductor 34 at a frequency having a period at least equal to substantially twice the time duration of an individual input pulse.

The circuit of Figure 7 illustrates still another embodiment of the invention in which the sawtooth component of the control signal is derived from the output circuit. To this end, a small load resistor 70 is connected in series between first cathode 30 and ground. The primary winding 71 of a voltage transformer 72 is connected in parallel with resistor 70, and the secondary winding 73 of transformer 72 is series-coupled in the input circuit between secondary winding 40 of input transformer 38 and feedback coil 65. The voltage fed back to the input circuit by way of transformer 72 comprises a control potential of sawtooth waveform which, when superposed on the voltage pulses fed back by way of feedback coil 65, operates to control the grid potential in the desired manner during the conductive period. Since the control signal comprises a sawtooth component, a self-biasing condenser 60 is used as in Figure 5. Again, the voltage ratio of feedback coil 65 with respect to output inductor 34 is preferably made substantially equal to the reciprocal of the effective amplification factor of device 32 as measured from control grid 37 to second cathode 31. With this arrangement, still greater grid current efficiency may be obtained with an input-signal from source 36 comprising negative pulses of relatively small magnitude.

Thus, the present invention provides, as a new tool in the art, an electron-discharge device having a biderectional electron-discharge path. Furthermore, the invention provides novel signal-generating apparatus embodying such a tube, and particularly, novel apparatus for generating an output current of sawtooth waveform with a minimum number of components at an efficiency much greater than that provided by prior art arrangements using conventional unilateral electron-discharge devices.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A bidirectional electron-discharge device comprising: a first cathode including a pair of cathode members each having an emissive surface; a second cathode disposed between said members and having a pair of emissive surfaces; and a control grid including conductive grid elements intermediate said second cathode and said members for controlling electron space current flow between said cathodes.

2. A bidirectional electron-discharge device comprising: a first thermionic cathode having an emissive surface; a heater for energizing said first cathode; a second thermionic cathode having an emissive surface opposed to that of said first cathode and arranged to be heated by radiation from said first cathode; and a control grid disposed between said emissive surfaces for controlling electron space current flow therebetween.

3. A bidirectional electron-discharge device comprising: a first thermionic cathode having an emissive surface; a heater for energizing said first cathode; a second thermionic cathode having an emissive surface opposed to that of said first cathode and arranged to be heated by radiation from said first cathode; a heat-reflecting shield substantially surrounding said cathodes; a control grid disposed between said emissive surfaces for controlling electron space current flow therebetween; and radiating fins secured to said control grid to prevent overheating of said grid.

4. A bidirectional high-vacuum electron-discharge device comprising: a first thermionic cathode including a pair of cathode members each having an emissive surface; means for indirectly heating each of said members; a second thermionic cathode disposed between said members and having a pair of emissive surfaces arranged to be heated by radiation from said members; a heat-reflecting shield substantially surrounding said cathodes; and a control grid surrounding said second cathode and having conductive grid elements disposed between said second cathode and said members to control electron space current flow between said cathodes.

5. Signal-generating apparatus comprising: a source of unidirectional operating potential; a reactive load circuit; and an electronic switching device including a high-vacuum thermionic electron-discharge device having a bidirectional electron-discharge path coupled in series with said source and said circuit for controlling current flow in said circuit.

6. Signal-generating apparatus comprising: a source of unidirectional operating potential; an inductive load circuit; and a bidirectional high-vacuum thermionic electron-discharge device having a bidirectional electron-discharge path coupled in series with said source and said circuit for controlling current flow in said circuit.

7. Signal-generating apparatus comprising: a bidirectional high-vacuum electron-discharge device having a pair of thermionic cathodes spaced from one another along an electron-discharge path and a control electrode disposed across said path intermediate said cathodes; a source of input signals; an input circuit including a coil coupled to said control electrode and to one of said cathodes for applying said input signals to said control electrode to control electron space current flow between said cathodes; a load circuit coupled between said cathodes; and means for impressing a unidirectional operating potential difference between said cathodes and in series with said load circuit.

8. Signal-generating apparatus comprising: a bidirectional high-vacuum electron-discharge device having a pair of thermionic cathodes spaced from one another along an electron-discharge path and a control electrode disposed across said path intermediate said cathodes; a source of input signals; an input circuit including a coil coupled to said control electrode and to one of said cathodes for applying said input signals to said control electrode to control electron space current flow between said cathodes; a current-limiting resistor included in said input circuit and coupled in series with said control electrode and said one cathode; a load circuit coupled between said cathodes; and means for impressing a unidirectional operating potential difference between said cathodes and in series with said load circuit.

9. Signal-generating apparatus comprising: a bidirectional high-vacuum electron-discharge device having a pair of thermionic cathodes and a control electrode intermediate said cathodes; a source of input signals coupled to said control electrode and to one of said cathodes to control electron space current flow between said cathodes; an inductive load circuit coupled between said cathodes; and means for impressing a unidirectional operating potential difference between said cathodes and in series with said load circuit.

10. Signal-generating apparatus comprising: a bidirectional high-vacuum electron-discharge device having a pair of thermionic cathodes and a control grid intermediate said cathodes; a load circuit and a source of unidirectional operating potential coupled in series between said cathodes; and a source of negative-polarity pulses coupled between said control grid and one of said cathodes for intermittently interrupting electron space current flow between said cathodes.

11. Signal-generating apparatus comprising: a bidirectional high-vacuum electron-discharge device having a pair of thermionic cathodes and a control grid intermediate said cathodes; a load circuit and a source of unidirectional operating potential coupled in series between said cathodes; and means including an input circuit coupled to said control grid and to one of said cathodes and including a current-limiting resistor and a grid-biasing condenser for applying a control signal between said grid and said one cathode to control electron space current flow between said cathodes.

12. Signal-generating apparatus comprising: a bidirectional high-vacuum electron-discharge device having a pair of thermionic cathodes and a control grid intermediate said cathodes; a load circuit and a source of unidirectional operating potential coupled in series between said cathodes; and means including an input circuit coupled to said control grid and to one of said cathodes and comprising means coupled to said load circuit for applying a control signal between said grid and said one cathode to control electron space current flow between said cathodes.

13. Signal-generating apparatus comprising: a bidirectional high-vacuum electron-discharge device having a pair of thermionic cathodes and a control grid intermediate said cathodes; an inductive load circuit and a source of unidirectional operating potential coupled in series between said cathodes; and means including an input circuit coupled to said control grid and to one of said cathodes and comprising a feedback coil inductively coupled to said load circuit for applying a control signal between said control grid and said one cathode to control electron space current flow between said cathodes.

14. Signal-generating apparatus comprising: a bidirectional high-vacuum electron-discharge device having a pair of thermionic cathodes and a control grid intermediate said cathodes and having an effective amplification factor as measured from said grid to one of said cathodes; an inductive load circuit and a source of unidirectional operating potential coupled in series between said cathodes; and means including an input circuit coupled to said control grid and to the other of said cathodes and comprising a feedback coil inductively coupled to said load circuit and having a voltage ratio with respect to said circuit substantially equal to the reciprocal of said amplification factor for applying a control signal between said grid and said other cathode to control electron space current flow between said cathodes.

15. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an input circuit including an inductor coupled between said grid and one of said cathodes; an input-signal source coupled to said input circuit for applying to said control grid input pulses of predetermined time duration short relative to their periodicity; an output circuit coupled between said cathodes and resonating at a frequency having a period at least equal to substantially twice said predetermined time duration; and means for impressing a unidirectional operating potential difference between said cathodes and in series with said output circuit.

16. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an input circuit including an inductor coupled between said grid and one of said cathodes; an input-signal source coupled to said input circuit for applying to said control grid input pulses of predetermined time duration short relative to their periodicity; an output transformer having primary and secondary windings and having an effective capacity shunting said primary winding of magnitude to resonate with said primary winding at a frequency having a period at least equal to substantially twice said predetermined time duration; and means for impressing a unidirectional operating potential difference between said cathodes and in series with said primary winding.

17. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes; an input circuit including a coil coupled between said grid and one of said cathodes; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

18. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes; an input circuit including an inductor, a current-limiting resistor, and a grid-biasing condenser coupled between said control grid and one of said cathodes; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

19. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes to provide a series output current path; an input circuit coupled to said control grid and to one of said cathodes and including a feedback coil coupled to said output inductor; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

20. Signal-generating apparatus for generating an output current of sawtooth waveform comprising: a bidirectional high-vacuum electron-discharge device having a pair of thermionic cathodes and a control grid intermediate said cathodes and having an effective amplification factor measured from said grid to one of said cathodes; an output inductor and a source of unidirectional operating potential coupled in series between said cathodes; an input circuit coupled to said control grid and to the other of said cathodes and including a feedback coil inductively coupled to said output inductor and having a voltage ratio with respect to said inductor substantially equal to the reciprocal of said amplification factor; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

21. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes to provide a series output current path; an input circuit coupled to said control grid and to one of said cathodes; means included in said series output current path and coupled to said input circuit for applying a control potential to said control grid; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

22. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes to provide a series output current path; an input circuit coupled to said control grid and to one of said cathodes; means including a transformer having a primary winding coupled in said series output current path and a secondary winding coupled in said input circuit for applying a control potential to said control grid; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

23. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes to provide a series output-current path; an input circuit coupled to said control grid and to one of said cathodes; means included in said series output-current path and coupled to said input circuit for applying a control potential to said control grid; a feedback coil included in said input circuit and coupled to said output inductor; an input signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

24. Signal-generating apparatus for generating an output current of sawtooth waveform comprising: a bidirectional high-vacuum electron-discharge device having a pair of thermionic cathodes and a control grid intermediate said cathodes for controlling electron space current flow therebetween; an output inductor and a source of unidirectional operating potential coupled in series between said cathodes to provide a series output-current path; an input circuit coupled to said control grid and to one of said cathodes; means including a transformer having a primary winding coupled in said series output current path and a secondary winding series-coupled in said input circuit for applying a control potential to said control grid; a feedback coil included in said input circuit and coupled to said output inductor; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

25. Signal-generating apparatus for generating an output current of sawtooth waveform comprising: a bidirectional high-vacuum electron-discharge device having a pair of thermionic cathodes and a control grid intermediate said cathodes and having an effective amplification factor measured from said grid to one of said cathodes; an output inductor and a source of unidirectional operating potential coupled in series between said cathodes to provide a series output-current path; an input circuit coupled to said control grid and to one of said cathodes; means including a transformer having a primary winding coupled in said series output-current path and a secondary winding series-coupled in said input circuit for applying a control potential to said control grid; a feedback coil included in said input circuit and coupled to said output inductor and having a voltage ratio with respect to said output inductor substantially equal to the reciprocal of said amplification factor; an input-signal source coupled to said input circuit for applying to said control grid periodic input pulses of predetermined time duration short relative to their periodicity; and means effectively providing across said output inductor a capacity of magnitude to resonate with said output inductor at a frequency having a period at least equal to substantially twice said predetermined time duration.

References Cited in the file of this patent

UNITED STATES PATENTS

| Number | Name | Date |
|---|---|---|
| 1,201,273 | De Forrest | Oct. 17, 1916 |
| 1,629,009 | Snook | May 17, 1927 |
| 2,037,202 | Terman | Apr. 4, 1936 |
| 2,218,331 | Etzrodt | Oct. 15, 1940 |
| 2,228,276 | LeVan | Jan. 14, 1941 |
| 2,242,351 | Etzrodt | May 20, 1941 |
| 2,288,363 | McArthur | June 30, 1942 |
| 2,377,456 | Spitzer | June 5, 1945 |

FOREIGN PATENTS

| Number | Country | Date |
|---|---|---|
| 214,025 | Switzerland | July 1, 1941 |